(12) United States Patent
Gambhir

(10) Patent No.: US 12,164,757 B2
(45) Date of Patent: Dec. 10, 2024

(54) INTELLIGENTLY CUSTOMIZED AND OPTIMIZED HOME SCREEN

(71) Applicant: Microsoft Technology Licensing, LLC, Redmond, WA (US)

(72) Inventor: Prerana Dharmesh Gambhir, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/882,017

(22) Filed: Aug. 5, 2022

(65) Prior Publication Data
US 2024/0045581 A1    Feb. 8, 2024

(51) Int. Cl.
*G06F 3/04845* (2022.01)
*H04N 7/15* (2006.01)

(52) U.S. Cl.
CPC ........... *G06F 3/04845* (2013.01); *H04N 7/15* (2013.01)

(58) Field of Classification Search
CPC .......... G06N 20/00; G06N 5/025; G06N 3/08; G06N 3/045; G06N 5/04; G06N 3/047; G06N 5/02; G06N 3/044; G06N 7/01; G06N 3/006; G06N 3/084; G06N 5/022; G06N 20/10; G06N 20/20; G06N 3/04; G06N 3/088; G06N 5/01; G06N 3/048; G06N 3/063; G06N 5/045; G06N 3/02; G06N 3/042; G06N 3/043; G06N 3/086; G06N 3/105; G06N 5/027; G06N 5/046
See application file for complete search history.

(56) References Cited

U.S. PATENT DOCUMENTS

| | | | |
|---|---|---|---|
| 11,366,963 B1* | 6/2022 | Morrison | G06F 40/186 |
| 2012/0278738 A1* | 11/2012 | Kruse | G06Q 10/10 715/756 |
| 2014/0075352 A1* | 3/2014 | Hansen | G06F 9/4451 715/765 |
| 2014/0245188 A1* | 8/2014 | Berger | G06Q 50/01 715/753 |
| 2015/0169183 A1* | 6/2015 | Son | G06F 3/04817 715/765 |
| 2015/0288522 A1* | 10/2015 | McCoy | G06F 21/31 726/9 |

(Continued)

OTHER PUBLICATIONS

"Bing Family of Search APIs", Retrieved From: https://docs.microsoft.com/en-us/bing/search-apis/bing-web-search/bing-api-comparison, Oct. 28, 2020, 3 Pages.

(Continued)

*Primary Examiner* — Rayeez R Chowdhury

(57) ABSTRACT

A recommended display layout and recommended content can be provided to a system for optimizing and personalizing the home screen of an application or special purpose computing device. The recommended display layout and recommended content can be generated by an advanced intelligence system that is trained to generate the recommendations based on input including display parameters, a user profile associated with the application or special purpose computing device, and a substrate profile. Other profiles may be used to further personalize the home screen including social media profiles, browsing profiles, productivity application profiles, and the like.

20 Claims, 6 Drawing Sheets

(56) References Cited

U.S. PATENT DOCUMENTS

| | | | | |
|---|---|---|---|---|
| 2018/0276630 | A1* | 9/2018 | Kim | G06F 3/0488 |
| 2020/0301571 | A1* | 9/2020 | Sandu | G06F 3/04845 |
| 2020/0320592 | A1* | 10/2020 | Soule | G06F 16/438 |
| 2023/0111115 | A1* | 4/2023 | Ramarao | G06Q 10/06398 |
| | | | | 705/7.29 |
| 2023/0205905 | A1* | 6/2023 | Paul | G06F 21/6209 |
| | | | | 726/26 |

OTHER PUBLICATIONS

"International Search Report and Written Opinion Issued in PCT Application No. PCT/US2023/027723", Mailed Date: Oct. 30, 2023, 12 Pages.

* cited by examiner

INTELLIGENTLY CUSTOMIZED AND OPTIMIZED HOME SCREEN

BACKGROUND

A user may have multiple computing devices used for various tasks, and users are using computing devices to interact with increasing applications. For first-run experiences on a new device or with a new application, the user is burdened with customizing and personalizing their environment. For users that do not have the time or desire to personalize their applications and devices, the experience of using the application or device is lacking because features that may be helpful to the user may be left unconfigured.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for intelligently customizing and optimizing a home screen for a user. One general aspect includes a computer-implemented method that includes receiving, from a special purpose computing device, a request for a display layout and content for a home screen for the special purpose computing device. The request may include a user account associated with the special purpose computing device. The computer implementing the method accesses display parameters of the special purpose computing device, first user information from a first user profile associated with the user account and the special purpose computing device, and second user information from a substrate profile associated with the user account. The computer provides input including the first user information, the second user information, and the display parameters to an artificial intelligence system trained to generate a recommended display layout and recommended content based on the input, where the recommended display layout may include formatting information for widgets to display on the home screen. The number of widgets, the type of widgets, and the location of the widgets can be optimized based on the display parameters and the information about the user to provide a customized home screen environment for the user. Additionally, recommended content for each of the widgets may be selected based on the user information. The computer may receive the recommended display layout and the recommended content from the artificial intelligence system. The computer may transmit the recommended display layout and the recommended content to the special purpose computing device to use to configure the home screen display. Other embodiments of this aspect include corresponding computer systems, apparatus, and computer programs recorded on one or more computer storage devices, each configured to perform the actions of the methods.

Implementations may include one or more of the following features. The input to the artificial intelligence system may further include user information from a social media account associated with a user of the user account. The input to the artificial intelligence system may further include user information from a browser profile associated with the user account. The browser profile may include search history, news channel preferences, tracked stock preferences, wallpaper, and voice assistant command history.

In some embodiments, the special purpose computing device is a dedicated video conferencing device.

In some embodiments, the computer-implemented method may include storing the recommended display layout, the recommended content, and an identifier of the special purpose computing device in a data store or memory.

In some embodiments, the computer may receive a subsequent request for the display layout and the content for the home screen from the special purpose computing device. The computer may determine that the recommended display layout and recommended content have previously been provided. The computer may access updated user information and provide it to the artificial intelligence system with the recommended display layout previously provided. The artificial intelligence system may be further trained to generate an updated recommended content for the recommended display layout based on the updated input. The computer may receive the updated recommended content from the artificial intelligence system and transmit it to the special purpose computing device to use to configure the home screen display. In some embodiments, the computer may transmit the recommended display layout with the updated recommended content to the special purpose computing device to use for displaying the home screen.

In some embodiments, the first user information may include calendar information associated with the first user profile, notifications associated with the first user profile, existing application integration associated with the first user profile, and user display preferences. The second user information may include one or more of a name of a user associated with the user account, a location of the user, a role of the user, and calendar events associated with the second user profile. The display parameters may include one or more of display screen space, built-in applications, and application sizing information. Implementations of the described techniques may include hardware, a method or process, or computer software on a computer-accessible medium.

BRIEF DESCRIPTION OF THE DRAWINGS

Non-limiting and non-exhaustive examples are described with reference to the following figures.

DETAILED DESCRIPTION

Figure 1:
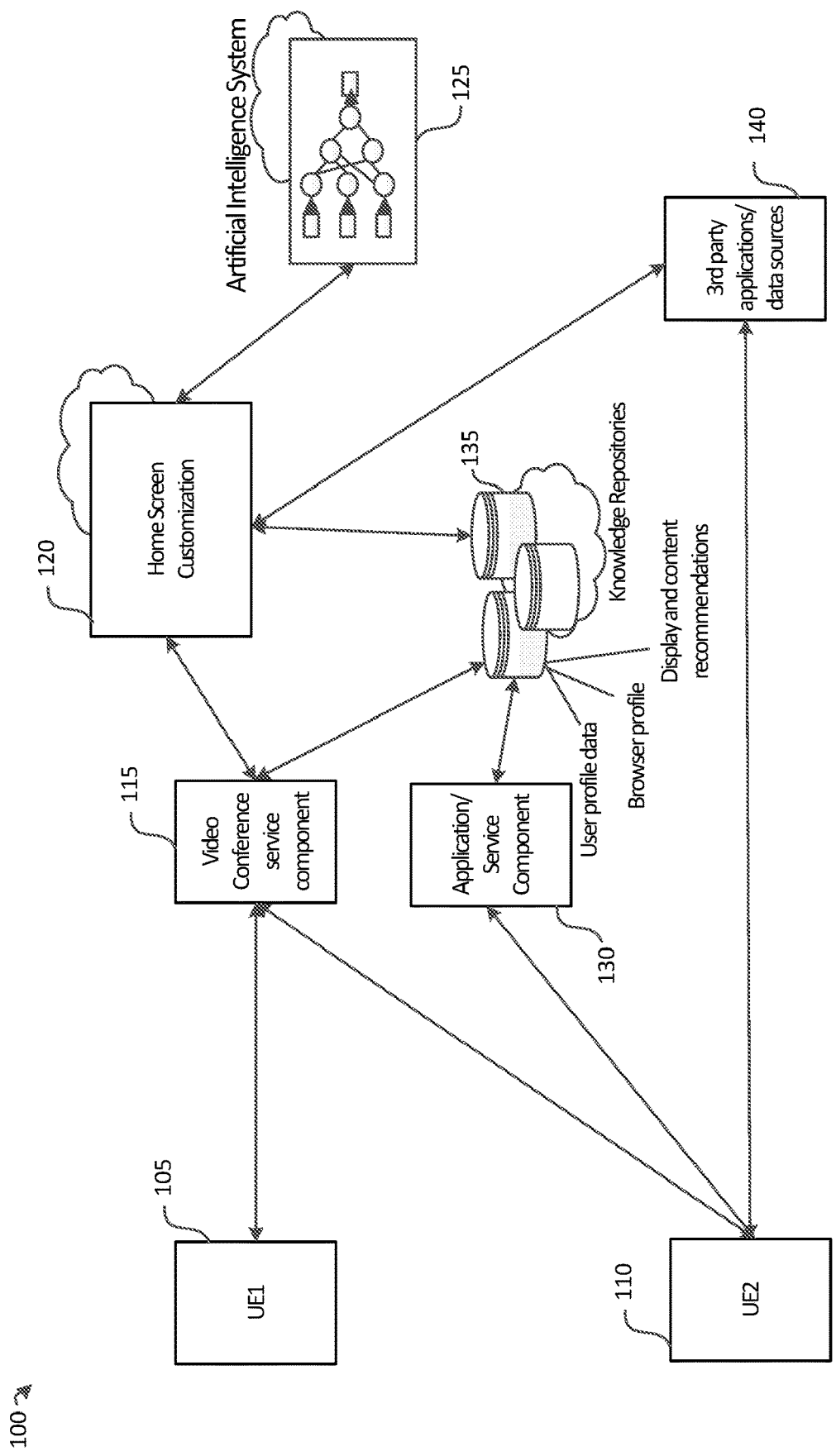
FIG. 1 is a schematic diagram illustrating an example computing environment for intelligent optimization of home screen customization.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for intelligently optimizing and customizing a home screen for a user device or application. For user devices, including special purpose computing devices (e.g., video conferencing devices), and applications that can be customized, user information and device information is used to optimize the display layout and customize the display for the user based on their preferences, history, and the like. Special purpose computing devices, such as video conferencing devices, have limited functionality. Where a typical home user computer or laptop has an operating system that allows the installation of various applications that can be used for a variety of tasks, a special purpose computing device typically has limited functionality, and installation of other applications is restricted. Video conferencing devices, as an example, may have a single user interface for the video conferencing application (e.g., Microsoft Teams®). A feature of such devices may include the ability to integrate a third-party application via a widget. For example, a weather widget may provide weather information and a news widget may provide a news feed. These widgets may be integrated without the installation of a weather application or news application on the device. The widgets may be integrated using an "application store" from which the widgets may be selected for inclusion in the device. Further, the available widgets may be limited by the software on the device to only widgets that have been integrated by the software operating the special purpose computing device (e.g., video conferencing interface and management software on the video conferencing device; Microsoft Teams®).

The descriptions provided herein focus on a special purpose computing device home screen use case. However, this disclosure is not limited to home screens of special purpose devices. Applications may include home screens that can be optimized for the user in a similar way. The application may be displayed on a portion or all of a screen for a device and have the ability to incorporate widgets or other elements that can be tailored to the user and the screen space available for displaying content.

In some embodiments, the special purpose computing device may provide a request to a service for home screen customization. For example, a first run of the device may trigger the request. The request may include a user account for the user. A home screen customization system may obtain the device parameters of the device (e.g., available display space, user profile information associated with the user account for the special purpose computing device (e.g., user profile information from the video conferencing system), and substrate profile information associated with the user account (e.g., a profile based on a common user account for multiple applications). The home screen customization system may provide the display parameters and the user profile information to an artificial intelligence system trained to use the input to generate an optimized home screen experience for the particular user given the display parameters. The artificial intelligence system may determine the number of widgets that can optimally fit within the available space according to inferred user preferences. Based on the user profile information and the number of widgets, the artificial intelligence system can infer which type of widgets would be most helpful or preferred by the user. Given the user profile information, which may include historical and behavioral information, the artificial intelligence system can select the appropriate widget types and locations for them in the available space to optimize the experience for the user. Additionally, given the user profile information, the content of the widgets can be recommended to suit the user. The home screen customization system can provide the display layout recommendation and content recommendation to the special purpose computing device to implement in displaying the home screen.

In some embodiments, the special purpose computing device receives the recommended display layout and recommended content and configures the home screen based on the recommendations. In a first run experience for the user, the configuration may provide a personalized experience without direct user input. The user may modify the configuration manually as desired. The special purpose computing device may store the user modified configuration and/or provide the updated layout to the home screen customization system to store for later use. On subsequent requests for customization, the home screen customization system may use the user-modified layout and only provide content recommendations based on updated user profile information.

In some embodiments, additional information may be incorporated as input to the artificial intelligence system including a browsing profile, social media profiles, or other user account profiles that may be used to infer the user's preferences.

The systems, methods, and devices described herein provide technical advantages for first run experiences and user experiences generally. Typically, a first run experience entails the user facing default settings that the user must spend time customizing. The solutions provided herein provide a customized and optimized first run experience for a user. Further, the artificial intelligence system is trained to optimize the display usage for the specific device. A device with a large screen may have a much different optimization than one with a little screen. Additionally, other application integration is taken into account which further optimizes the displayed elements not just based on screen size but available display area, reducing the processing power needed to render the display, and limiting non-visible elements.

FIG. 1 is a schematic diagram illustrating an example computing environment 100 for intelligent optimization of home screen customization. Computing environment includes a first user equipment (UE) 105, a second UE 110, video conference service component 115, home screen customization 120, artificial intelligence system 125, application/service component 130, knowledge repositories 135, and third-party applications and data sources 140. Computing environment 100 may include more components that are not shown for ease of description. For example, many more UEs may be in computing environment 100 but are not shown for simplicity.

Figure 5:
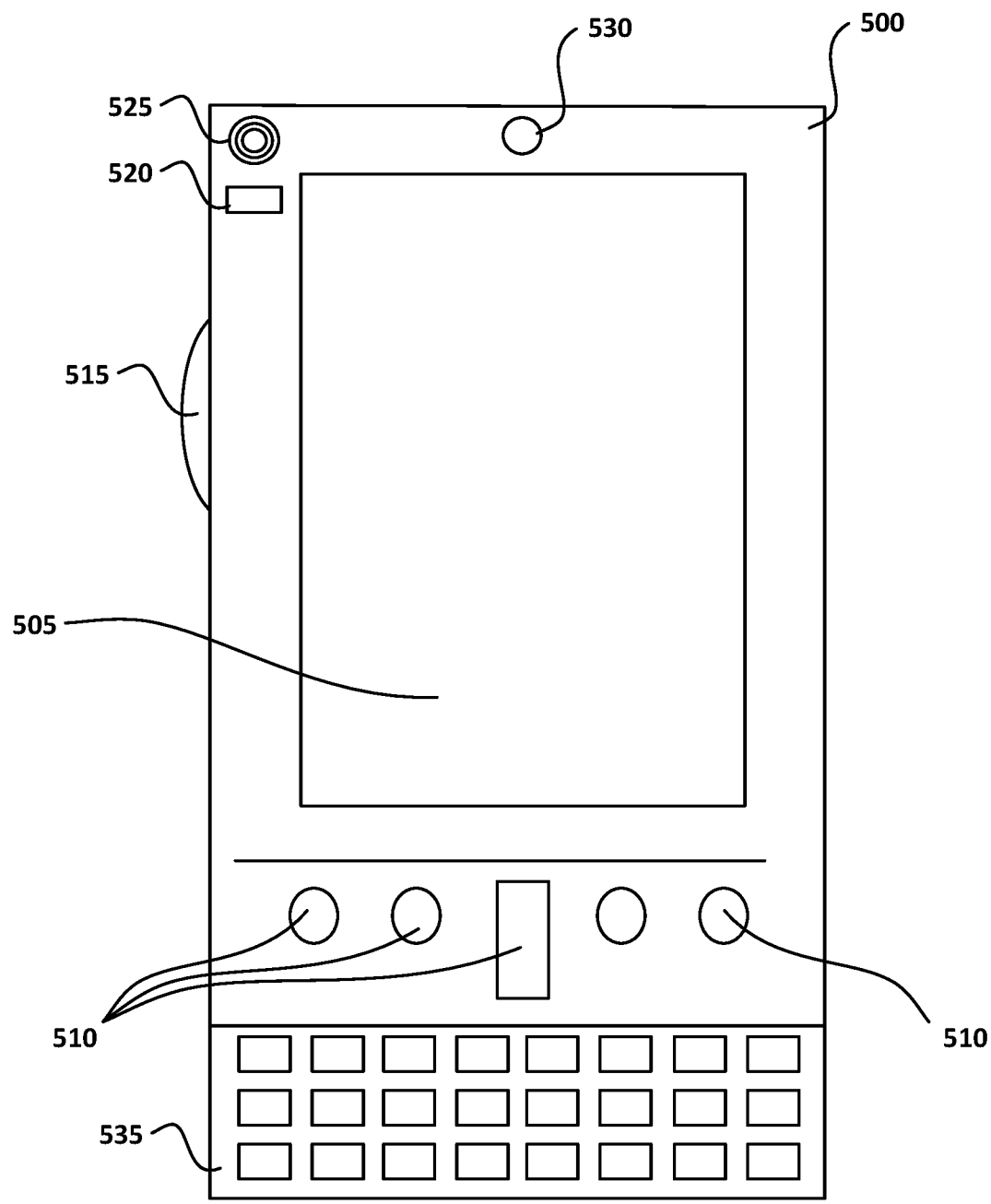
FIGS. 5 and 6 are simplified diagrams of a computing device with which aspects of the disclosure may be practiced.
Figure 6:
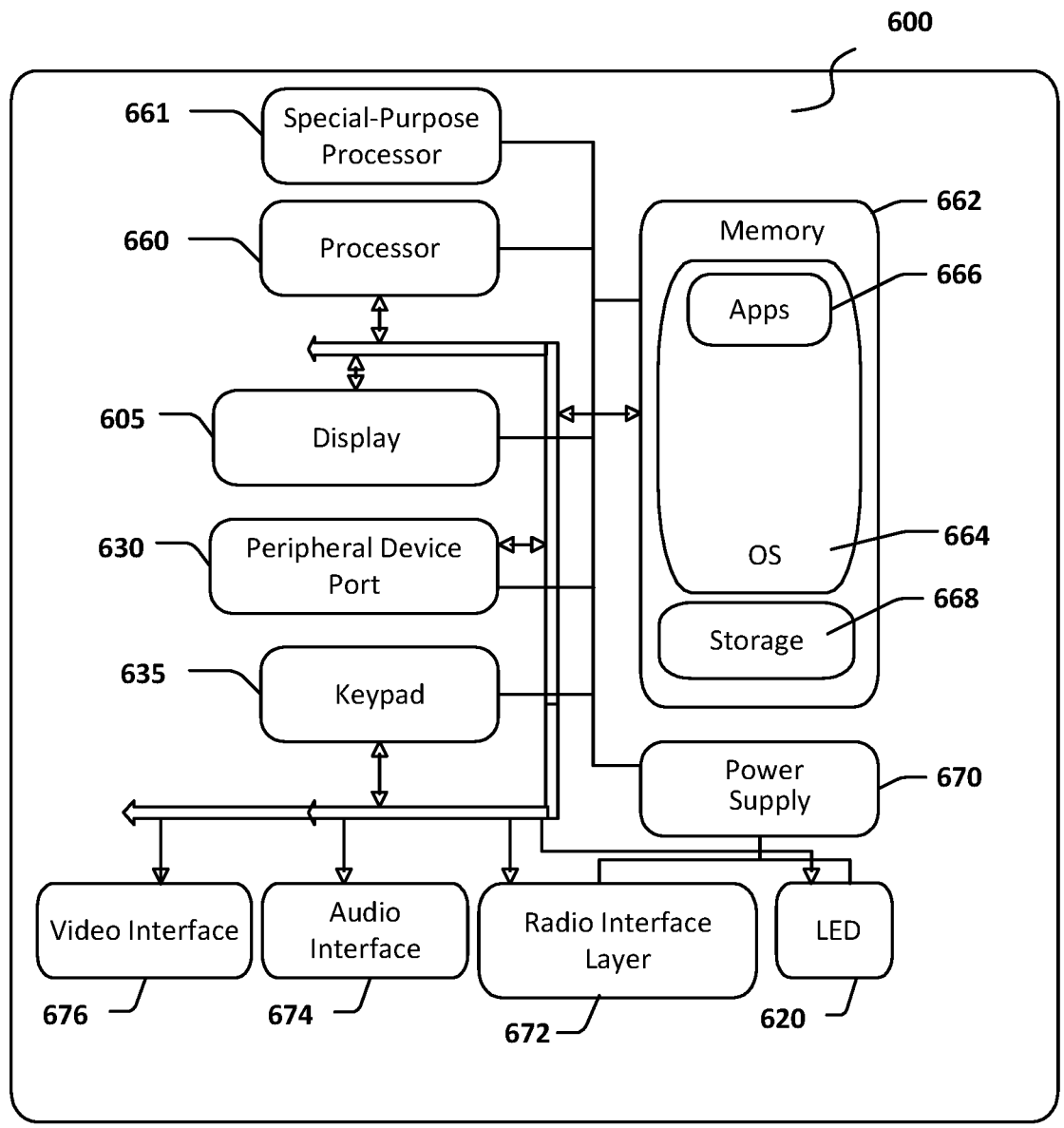

UE 105 may be a computing device such as computing device 500 or 600 as shown with respect to FIGS. 5 and 6. UE 105 may be a special purpose computing device that performs a specific function. For example, video conferencing has become pervasive, and special purpose devices are available to use for video conferencing that leave the user's regular computing device (e.g., desktop computer, mobile phone, laptop computer, or the like) available for other use while participating in a video conference. UE 105 may be a video conferencing device. Such video conferencing devices have software installed to manage the operation of the device without the ability for the user to install other software applications. Accordingly, there is a management program (e.g., Microsoft Teams®) that provides all video conferencing features. In operation, the management program displays a home screen to the user with selections for using the video conferencing features. Additionally, the management program may offer the user the ability to incorporate widgets that provide content from integrated applications offered by the management program. The widgets may be available to the user through, for example, an "app store" during typical usage of the device. The user may be provided with a customized and optimized home screen incorporating widgets and content that is personalized for the specific user using the features described herein. For example, on a first run experience, upon user request, at a system update, or at other appropriate times the customization and optimization may be provided or updated.

As described above, UE 105 may be a video conferencing device or some other special purpose device. However, the features described in this disclosure are not limited to customization of a special purpose computing device home screen. In some embodiments, UE 105 is a standard computing device with an installed application that includes a home screen that may similarly be customized For example, a video conferencing application on a standard computing device (i.e., not special purpose computing device) may have a home screen that may be customized. Further, this disclosure is not limited to video conferencing. Any type of application or special purpose computing device may be managed and have a home screen that can be optimized and customized as described herein. For example, other special purpose computing devices may include a gaming system (e.g., Microsoft Xbox®), a television, a vehicle (e.g., a Tesla®), or any other special purpose device.

UE 105 includes a display that has a fixed screen size. The display may include other parameters as well. For example, for the given application, the available screen space may not be the entire screen. Rather, installed applications, the features with required elements for display for the application, and their location may impact the amount of available display screen space. It is within the available display screen space that widgets may be sized, located, and filled with content that is personalized to the user.

When the user logs into the UE 105, the user may use a login that is associated with a user profile for the device or the relevant application. For example, the user may log in using a video conferencing user account. The video conferencing service may be provided as a cloud-based service, so UE 105 may access the video conference service component 115 to log in and use the service. As noted below, the video conferencing user account may be a common user account used for many different services.

UE 110 may be a computing device such as computing device 500 or 600 as shown with respect to FIGS. 5 and 6. UE 110 may be another computing device that the user may use to access the video conference service component 115. The user may use UE 110 for other cloud-based services including a service for productivity applications (e.g., Microsoft Office®, Word®, Excel®, PowerPoint®, and the like) for which the user has a user account and an associated user profile. In some embodiments, the user account for the productivity applications may be the same user account for the video conferencing service. However, the user account when used for the video conferencing may use a different user profile specific to video conferencing. The user may use UE 110 for browsing services (e.g., Microsoft Bing®) for which the user has a user account and an associated browser profile. In some embodiments, the user account for the browsing services may be the same user account for the video conferencing service. The user may also use UE 110 to access third party applications 140 (e.g., social media). The user's activity on UE 110 may modify information in the various profiles for the user. For example, browser activity may update the browser profile with updated history information.

Video conference service component 115 may provide video conferencing services to UE 105 and UE 110 when the user logs into the video conference service component 115 with a user account. The video conference service component 115 may be implemented on a server computer or distributed computing environment, a server farm, or the like. The computing device that implements the video conference service component 115 may be a computing device 600 as described with respect to FIG. 6. The video conference service component 115 may access the knowledge repositories 135 to access the user's profile and store changes to the user's video conferencing profile as needed. Upon request from UE 105, the video conference service component 115 may send a request to home screen customization 120 to customize the home screen for UE 105 as described in more detail below.

Application/service component 130 is a user interface component for providing cloud-based services to UE 110. UE 110 may access many different application/service components 130 for various services, though only one is shown for ease of description. Application/service component 130 may be implemented on a server computer or distributed computing environment, a server farm, or the like. The computing device that implements application/service component 130 may be a computing device 600 as described with respect to FIG. 6. Application/service component 130 may provide productivity application services, browsing services, or any other services available. The user may log into the application/service component 130 using the user account, which may be the same as the user account used to access the video conference service component 115. The application/service component 130 may access the relevant user profile in the knowledge repositories 135 and update the relevant user profile as needed. For example, if application/service component 130 is a browser service, the user's browser profile may be accessed in the knowledge repositories 135 and updated by the application/service component 130 based on the user behaviors and activity.

Knowledge repositories 135 may store user profile data for user accounts. Knowledge repositories 135 may be implemented on a storage device such as a computing device having memory elements for storing data (e.g., a database). The computing device may be a computing device 600 as described with respect to FIG. 6. The user profile data may be specific to a given service even if linked via a common user account. For example, a single user account may have a browser profile from a browsing service (Microsoft Bing®), a video conferencing profile from a video conferencing service (Microsoft Teams®), and a productivity application profile from a productivity application service (e.g., Microsoft Word®, Excel®, PowerPoint®, and the like). In such scenarios, the user account may include a substrate profile of generic information for the user that is applicable to all services. For example, a substrate profile may include the user's name, role, location, calendar events, and the like.

Third party applications/data sources 140 may include other applications that the user may log into or utilize from UE 110. Third party applications may include, for example, social media applications that a user may use UE 110 to access. Third party applications/data sources 140 may be implemented on a server computer or distributed computing environment, a server farm, or the like. The computing device that implements third party applications/data sources 140 may be a computing device 600 as described with respect to FIG. 6. The user accounts used to access third-party applications/data sources 140 are typically different than the user account used to access application/service component 130 and video conference service component 115.

Home screen customization 120 may provide the home screen optimization and customization functionality. Home screen customization 120 may receive a request to customize the home screen for UE 105. The request may include the user account information for the user associated with the video conference service component 115. Home screen customization 120 may be implemented on a server computer or distributed computing environment, a server farm, or the like. The computing device that implements home screen customization 120 may be a computing device 600 as described with respect to FIG. 6. Home screen customization 120 may obtain the display parameters for UE 105. In some embodiments, the parameters may be included in the request. In some embodiments, the parameters may be included in the user profile for UE 105 (e.g., the video conferencing profile). Home screen customization 120 may access the user profile for the user account associated with UE 105 (e.g., the video conferencing profile) in the knowledge repositories 135. Home screen customization may also access other user profiles associated with the user account including, for example, a browser profile, a substrate profile, a productivity application profile, and/or the like. Home screen customization 120 may also access third-party applications/data sources 140 if such access is configured and permission has been provided by the user. For example, the user may provide access to integrate various third-party applications or access third-party data sources from third-party applications/data sources 140 in a user profile for any of the other services associated with the user account. For example, the browsing profile may have access authorization to a social media account provided by third-party applications/data sources. As another example, on a different device, the user may integrate various widgets from, for example, an "app store," using the user profile associated with UE 105 (e.g., the video conferencing profile). Home screen customization 120 can format the collected user profile information and display parameter data into a valid format for input to artificial intelligence system 125.

Artificial intelligence system 125 may be implemented on a server computer or distributed computing environment, a server farm, or the like. The computing device that implements artificial intelligence system 125 may be a computing device 600 as described with respect to FIG. 6. Artificial intelligence system 125 may utilize a neural network, machine learning, models, or any other artificial intelligence algorithm that can be trained to infer an output based on an input. The artificial intelligence system 125 is trained to receive the user profile information and the display parameter information from UE 105 and provide a recommended display layout and recommended content to optimize and personalize the available screen space for the user of UE 105. To optimize and customize the display layout, the artificial intelligence system 125 may determine how many widgets, the locations of the widgets, and the type of widgets as well as quick access buttons that can optimally fit on the available screen space given known user preferences from the user profiles, the physical screen size of UE 105, the resolution of the display, the installed applications, and the location of other elements that are required on the home screen. In some embodiments, the required elements may be re-located to optimize the home screen, which the artificial intelligence system 125 may adjust to generate the recommended display layout. In addition to determining a recommended number and location of the widgets, the artificial intelligence system 125 identifies a type for each widget that is customized for the user based on the user's profiles that were used in the input. For example, the user profile information may include user preference information, location information, search history, stock tracking history, and the like. Widget types may include weather widgets, social media widgets, productivity application widgets, news widgets, stock widgets, and so forth. Given the known history of a user, such as their browsing history, shopping history, and other behaviors, the artificial intelligence system can select the appropriate widget types for each located widget to optimize the home screen experience for the user. For example, a user that is very active on social media may have a social media widget in a dominant location and size on the home screen, while a user that regularly follows stocks may have a stock widget in a dominant location and size on the home screen. Different yet, a user that closely follows news and weather may have two smaller widgets in a dominant location on the home screen to best tailor the home screen for that user. Additionally, given the user profile information, the content of the widgets can be recommended to suit the user. For example, the known location of the user may be used to provide a content recommendation for a weather widget to show the local weather for that user. Similarly, for example, stock widgets can be populated with stocks the user tracks and news widgets can be populated with news feeds from the user's preferred sources. Further, while the recommended display layout and recommended content may be provided to the user, the user can manually modify the display layout and content at will. Such modifications may be stored for future use in subsequent requests for content updates, design layout updates, used to infer user preferences for customization of other device home screens, and the like.

Additionally, in some embodiments, the home screen may include multiple "pages," which the user can scroll between by, for example, swiping left or right to access other functionality, widgets, integrated applications, and the like. Each of these "pages" may be customized and optimized by the artificial intelligence system 125 based on the inputs. For example, artificial intelligence system 125 may infer user preferences for a number of "pages" to generate and populate in addition to the design layout for each page.

Artificial intelligence system 125 and home screen customization 120 are depicted as cloud-based systems. However, in some embodiments, the functionality provided may be incorporated into UE 105 and executed locally rather than in the cloud.

Once the artificial intelligence system 125 outputs the recommended display layout and recommended content for the home screen for UE 105, home screen customization 120 provides the recommendations to the video conference service component 115, which provides the recommendations to UE 105. UE 105 may use the recommendations to provide an optimized home screen experience for the user that implements the recommendations.

In some embodiments, the home screen customization 120 or the video conference service component 115 may store the recommended display layout and recommended content in the video conference user profile for the user in the knowledge repositories 135. In some embodiments, the home screen customization 120 or the video conference service component 115 may store the recommended display layout, recommended content, and an identifier of the UE 105 in knowledge repositories 135. In some embodiments, UE 105 stores the recommended display layout and recommended content locally in a memory of UE 105.

In some embodiments, the user may modify the recommended display layout and/or the recommended content by moving widgets around the home screen, removing widgets, adding widgets, modifying the content of the widgets, and the like. These user selected modifications can be used to update the display layout for the home screen of UE 105 by storing it in memory locally and/or in knowledge repositories 135 in place of the recommended display layout and recommended content.

Subsequent requests for home screen customization for UE 105 may be received by home screen customization 120. As the user continues using the user accounts, the user profile information may change. For example, browsing profiles may change substantially over time. A user may modify the stocks they follow, a user may have other interests and change the news they watch, the search queries they make, and so forth. However, to avoid changing the user experience suddenly without warning, a subsequent request for customization may be used to update the recommended content within the existing display layout (i.e., the previously recommended display layout or the user modified display layout). Accordingly, for example, a subsequent request may be received by home screen customization 120. The request may include the user account. The home screen customization 120 may determine that a previous recommendation was sent including a recommended display layout and recommended content. Home screen customization may include the existing display layout as input to the artificial intelligence system 125 along with the previously described user profile information. The artificial intelligence system 125 may be trained to utilize that input to update the recommended content for populating the existing display layout based on the updated user profile information from all available sources (e.g., browser profile, social media profile, productivity application profile, video conferencing profile, substrate profile, and the like).

In some embodiments, UE 105 may be a hot desking device that is used by multiple users. In such embodiments, the customization and optimization of the home screen for UE 105 is specific to each user that logs in. For example, a first user may log in, and the advanced intelligence system 125 may provide display layout recommendations and content recommendations for that specific user. A second user may log in, and the advanced intelligence system 125 may provide display layout recommendations and content recommendations for the second specific user that likely differ from the recommendations for the first user. The recommendations and content for each specific user, including any manual modifications by each user, may be stored locally or in knowledge repositories 135 for that user. Accordingly, when each user subsequently logs in to UE 105 the user's experience is continuous so that the user's display layout, preferences, widgets, and the like are the same customized and optimized experience as previous logins. In some embodiments, the content may also remain consistent, or it may be updated based on updated user information as described herein.

Advantageously, using computing environment 100, a user may have a first run experience on UE 105 that provides an optimized and customized home screen for the user. Further use of the various services in computing environment 100 that update user profiles for the user may be used to continue to personalize the home screen for the user over time.

Figure 2:
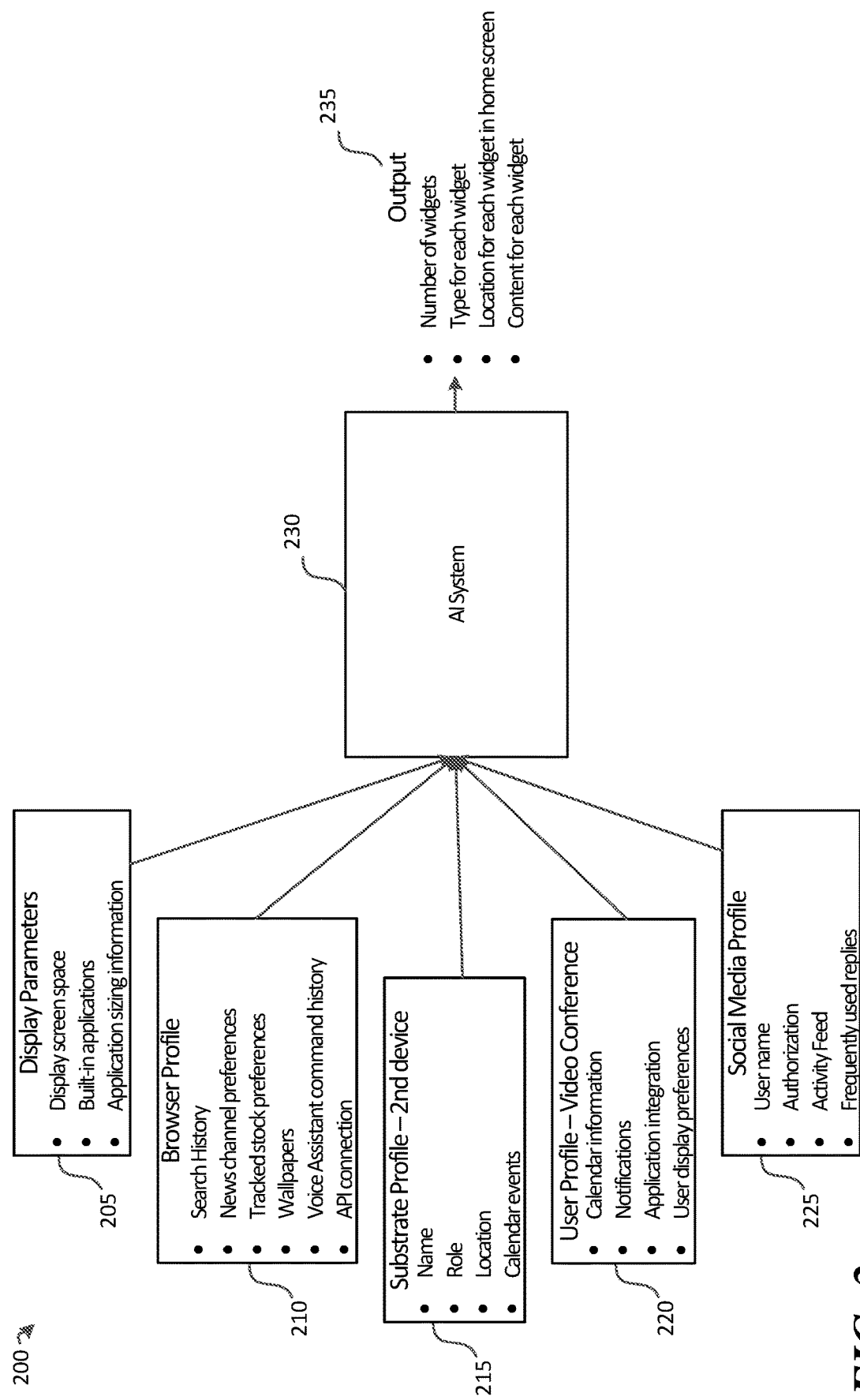
FIG. 2 is a schematic diagram illustrating an example data inputs and outputs of the advanced intelligence system that provides intelligent optimization and customization for home screens.

FIG. 2 is a schematic diagram 200 illustrating example data inputs 205, 210, 215, 220, 225 and outputs 235 of the artificial intelligence system 230 that provides intelligent optimization and customization for home screens. Artificial intelligence system 230 may be the same as artificial intelligence system 125 described with respect to FIG. 1. The example inputs 205, 210, 215, 220, 225 include display parameters 205, browser profile 210, substrate profile 215, video conference user profile 220, and social media profile 225. These inputs are exemplary, and other profiles and inputs may be used to customize the experience for the user. More than one profile of each type may be used as inputs and other types of information may further be used as input to the artificial intelligence system 230.

Display parameters 205 may include display screen space, built-in applications, and application sizing information for the relevant UE. For example, the physical screen size and display resolution may be used to determine the display screen space. The built-in applications may include required elements for inclusion on the home screen. The required elements may have designated locations or be movable by the advanced intelligence system. The size of the applications and amount of room they take up on the home screen may also be included in display parameters.

Browser profile 210 may be a profile associated with the user account based on a browsing service available to the user. The browser profile 210 may provide search history, news channel preferences, tracked stock preferences, wallpaper preferences, voice assistant command history, and advanced programming interface (API) connection information for the application or special purpose computing device to run the management software (e.g., Microsoft Teams®). The search history may include user preference information for visited websites, shopping history, and other information that may be used by artificial intelligence system 230 to infer user preferences. News channel preferences may be selected by the user or identified based on search and viewing history. Tracked stock preferences may be identified based on user searches as well as browser pages that allow a user to track specific stocks consistently. Wallpaper preferences may be stored and used by the artificial intelligence system 230 to identify user preferences for themes, color schemes, and so forth. Voice assistant command history may include history of the user's use of voice assistants (e.g., Microsoft Cortana®) including searches, requests, and other commands given that may be used to infer user preferences.

Substrate profile 215 may be a generic user profile for the user that is not specific to a given function, feature, or service provided for using the user account. The substrate profile 215 may be based on access from any UE the user may use, such as UE 110 as described with respect to FIG. 1. Substrate profile 215 may include the user's name, the user's role (e.g., role within a company or any other title the user may have selected), the user's location, calendar events for the user, an organizational chart for the user's organization, and the like. The substrate profile information may be used to recommend content for the user based on their location, for example. As another example, the organizational chart may provide information to prioritize team chats, meetings, notifications, and the like.

Video conference user profile 220 may be the user profile accessed based on using UE 105 as described with respect to FIG. 1. While a video conference service is used in the example shown, any special purpose service may have a home screen for customization. Video conference user profile 220 may include calendar information for the user, notifications for the user, application integrations the user has authorized or requested, and user display preferences. The calendar information may include scheduled meetings, recurring appointments, and the like. Notifications may include chats, reactions, missed appointments, missed calls, upcoming meetings, and the like. Application integrations may include applications the user has authorized or requested be integrated into use of the video conference application. For example, third party widgets may be authorized, requested, selected from an "app store," or the like, and the widgets, once integrated, can provide access to the third-party features while using the video conferencing service. User display preferences may include information about how a user has previously arranged user interfaces, which types of notifications and alerts the user prefers to receive or not receive, and the like.

Social media profile 225 may be a user profile associated with a social media account that the user has authorized access to. For example, the user may authorize access to LinkedIn® or Facebook®, and the social media applications may provide information based on an API that allows access to certain user profile information. For example, the social media profile 225 may include the username, authorization, activity feed information, and frequently used replies. The information in the social media profile 225 may be used, for example, to determine to include social media content in one of the widgets.

Artificial intelligence system 230 receives the inputs 205, 210, 215, 220, 225, for example from home screen customization 120 as described with respect to FIG. 1. In some cases, only some of the information described, or in other cases more information than is described, is provided in each of the inputs 205, 210, 215, 220, 225. In some cases, not all inputs 205, 210, 215, 220, 225 are present. For example, a social media profile 225 may not be included as an input in some cases. In some embodiments, additional inputs are included or replace some of the inputs described. Once artificial intelligence system 230 receives the inputs 205, 210, 215, 220, 225, advanced intelligence system generates the output 235. Artificial intelligence system 230, as described with respect to artificial intelligence system 125 of FIG. 1, is trained to generate recommended display layout and recommended content as output 235. The recommended display layout includes the number of widgets, a type for each widget, and a location for each widget in the display space. The recommended display layout is based on the display parameters including physical characteristics and other limiting elements like required elements of other applications. The recommended display layout is further based on the user profile information. For example, user preferences may indicate that a news type of widget be more prominent than a social media type widget. Additionally, because the number of widgets may be limited, the user preferences may indicate that a stock widget is not sufficiently preferred over other widgets to include on the home screen. The recommended content for each widget is based on the type of widget and user profile information. For example, a weather widget may provide local weather for the user based on the user's location. Additionally, user profile information may indicate that the user has a special interest in a second location such as a vacation location or dream destination. This additional information may be used by artificial intelligence system 230 to rotate weather between the local weather and the weather for the second location. In some cases, only the second location weather may be recommended as content, depending on the information in the user profile (e.g., the user never checks local weather but regularly checks the second location weather).

Figure 3:
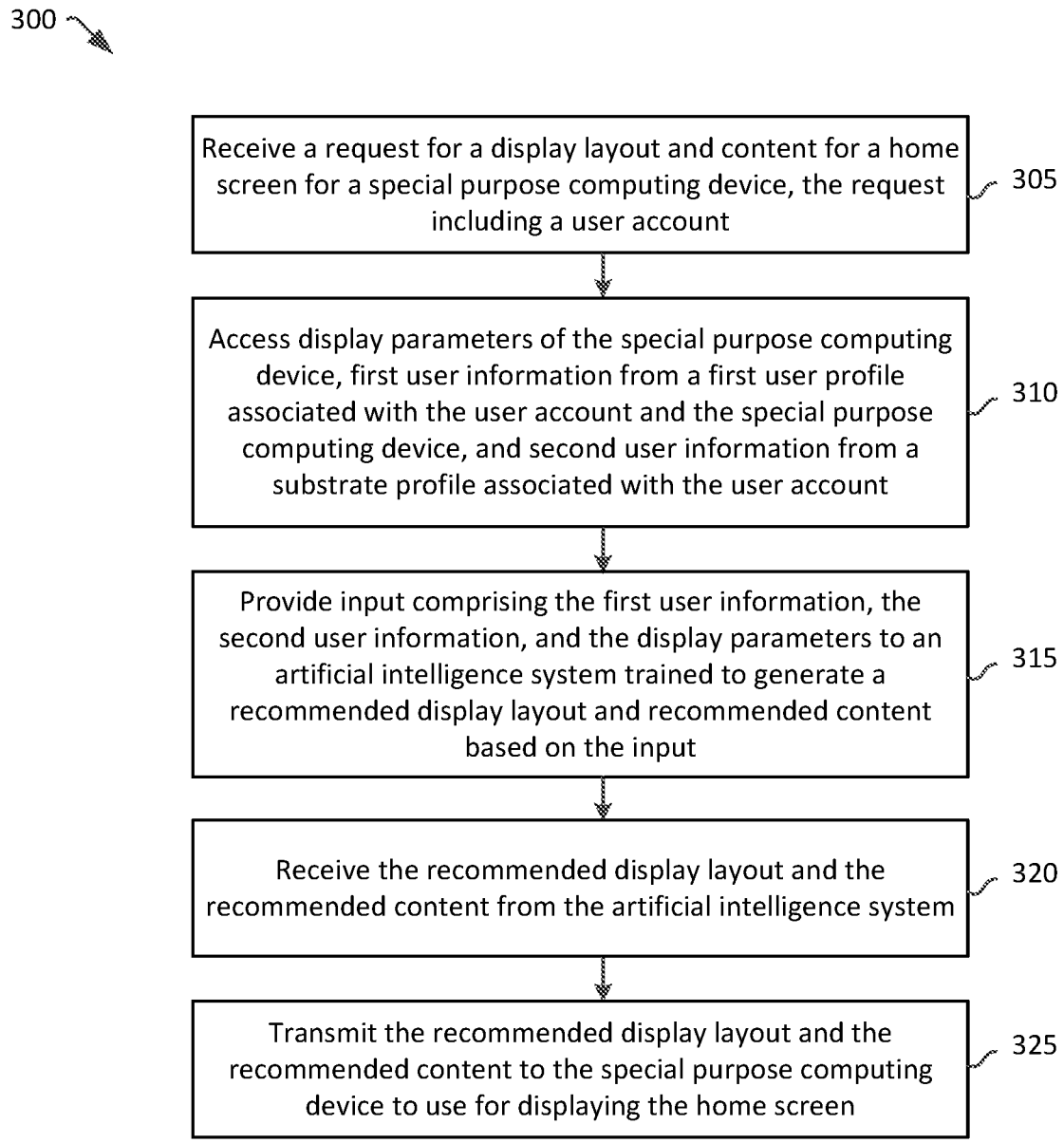
FIG. 3 is an exemplary method for intelligent home screen optimization and customization.

FIG. 3 is an exemplary method 300 for intelligent home screen optimization and customization. Method 300 may be performed by home screen customization 120. Method 300 begins at step 305 with the home screen customization 120 receiving a request for a display layout and content for a home screen for a special purpose computing device (e.g., UE 105). The request includes a user account. The request may be triggered by a first run experience of the special purpose computing device. In some embodiments, an update of the special purpose computing device may trigger the request. In some embodiments, a user indication may trigger the request. For example, the home screen may provide a user selectable option that triggers the request.

At step 310, home screen customization accesses display parameters of the special purpose computing device, first user information from a first user profile associated with the user account and the special purpose computing device, and second user information from a substrate profile associated with the user account. For example, the special purpose computing device (e.g., UE 105) may have display parameters that are provided with the request. In some embodiments, display parameters are stored in a knowledge repository (e.g., knowledge repositories 135). The display parameters may be display parameters 205. The first user information may be from the user profile associated with the special purpose computing device. For example, the special purpose computing device may be a dedicated video conferencing device, and the first user profile may be a video conferencing user profile. The first user profile may be video conference user profile 220. The second user information may be from a substrate profile associated with the user account. The second user information may be from substrate profile 215.

At step 315, home screen customization provides input including the first user information, the second user information, and the display parameters to an artificial intelligence system trained to generate a recommended display layout and recommended content based on the input. The artificial intelligence system may be artificial intelligence system 125 as described with respect to FIG. 1 and/or artificial intelligence system 230 as described with respect to FIG. 2. As previously described, the artificial intelligence system is trained to generate the recommendations. In some embodiments, additional inputs are included such as user information from a browser profile, user information from a social media profile, and the like.

At step 320, home screen customization receives the recommended display layout and the recommended content from the artificial intelligence system. At step 325, home screen customization transmits the recommended display layout and the recommended content to the special purpose computing device to use for displaying the home screen. When the special purpose computing device implements the recommended display layout and recommended content, the home screen is intelligently optimized and customized for the specific user.

Figure 4:
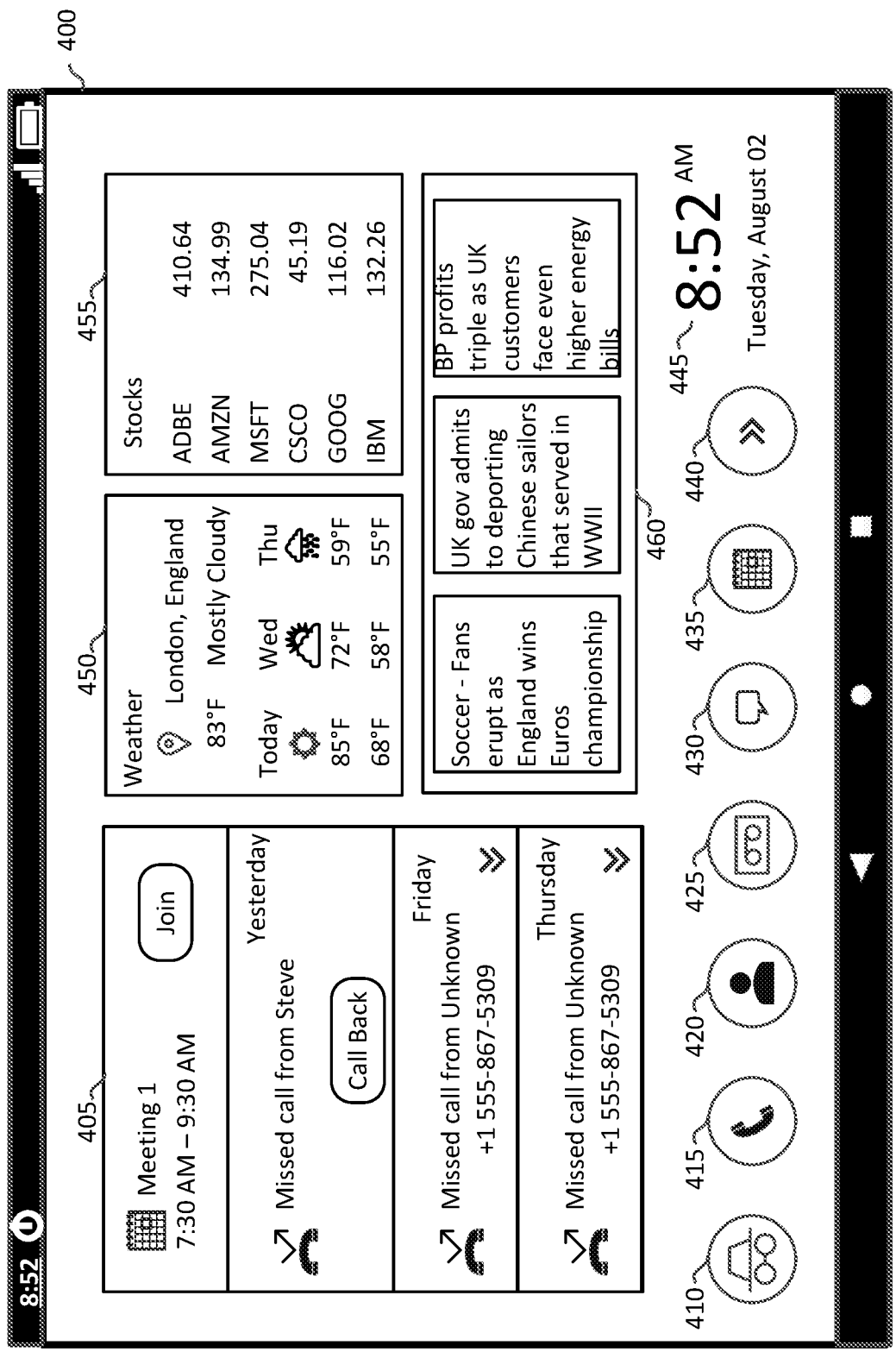
FIG. 4 is an exemplary user interface with an intelligently optimized and customized home screen.

FIG. 4 is an exemplary user interface 400 with an intelligently optimized and customized home screen. User interface 400 depicts a home screen for a special purpose computing device (e.g., UE 105). User interface 400 could also be a home screen for an application that implements a home screen. The user interface 400 is for a video conferencing home screen. Using the computing environment 100 described with respect to FIG. 1, the home screen is optimized and customized for a specific user. User interface 400 is exemplary to show how optimization and customization may look but is not intended to limit this disclosure to the specific layout, elements, or features shown on user interface 400.

User interface 400 includes a video conferencing notification window 405. The video conferencing notification window 405 includes, for example, meetings that are upcoming or currently in progress and missed call notifications. The portion of the screen used for video conferencing notification window 405 may be any type of required element for any type of special purpose computing device. Feature buttons for the video conferencing service may be required elements such as incognito 410, calls 415, contacts 420, voicemail 425, chat 430, calendar 435, and more features 440. These feature buttons are exemplary to show that required elements may be located on the customized home screen. Some of these elements may be strictly located on the screen in a given location while others may be re-located based on the artificial intelligence system. A time and date element 445 may be displayed as a required element as well. Other times, this may be a widget that the artificial intelligence system selects based on the display parameters and the user profile information available for determining the optimization and customization.

Three widgets 450, 455, 460 have been selected based on the display parameters and the user profile information. Weather widget 450 has been selected and located on the display based on information in the user profiles and the display parameters. Stock widget 455 has also been selected and located on the display based on information in the user profiles and the display parameters. News widget 460 has been selected and located on the display based on information in the user profiles and the display parameters. The artificial intelligence system determined this number, type, and locations (i.e., placement) of the widgets is optimized for the display space available and the user preferences.

The weather widget 450 has been populated with London, England current weather as the recommended content. This is based on user profile information that may include the user's location, user's search history, and the like. In some embodiments, the weather may rotate between two relevant locations for the user (e.g., a dream destination and a current location). The stocks widget 455 has been populated with current stock prices for several individual stocks based on the user's profile information (e.g., tracked stocks, search history, or the like). The news widget 460 is populated with current news from news sources preferred by the user based on the user's profile information.

The widgets 450, 455, 460 are exemplary based on example user profile information and display parameters. The number, size, type, location, and layout of the widgets 450, 455, 460 may differ based on the display parameters and the user preferences that are inferred by the artificial intelligence system. For example, the news widget 460 could be larger and on the top of the screen if the artificial intelligence system inferred that the user would prefer such a different layout and it was an optimized layout for the display. Fewer or more widgets could be included. The types of the widgets may also differ. For example, a person that loves travel may have a travel reservation widget rather than a stock widget 455. Further, the content displayed in each widget may differ based on preferences inferred by the artificial intelligence system. Each of these types of modifications makes for an optimized and customized experience for each user.

FIGS. 5 and 6 are simplified diagrams of a computing device 500, 600 with which aspects of the disclosure may be practiced. Computing device 500, may be, for example, a special purpose computing device, a mobile telephone, a smart phone, wearable computer (such as smart eyeglasses), a tablet computer, an e-reader, a laptop computer, or other personal computing device, with which embodiments of the disclosure may be practiced. With reference to FIG. 5, one aspect of a computing device 500 for implementing the aspects is illustrated. In a basic configuration, the computing device 500 is a computer having both input elements and output elements. The computing device 500 typically includes a display 505 and one or more input buttons 510 that allow the user to enter information into the computing device 500. The display 505 of the computing device 500 may also function as an input device (e.g., a touch screen display). If included, an optional side input element 515 allows further user input. The side input element 515 may be a rotary switch, a button, or any other type of manual input element. In alternative aspects, computing device 500 may incorporate more or fewer input elements. For example, the display 505 may not be a touch screen in some embodiments. In yet another alternative embodiment, the computing device 500 is a portable phone system, such as a cellular phone. The computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the computing device 500 incorporates a vibration transducer for providing the user with tactile feedback. In yet another aspect, the computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 6 is a block diagram illustrating the architecture of one example of a computing device 600 (e.g., UE 105, UE 110, computing device 500). Computing device 600 depicts components of a computing device used to implement the features and functionality of the computing systems described herein. The computing device 600 may be implemented as a user device capable of running one or more applications (e.g., browser, e-mail, calendaring, contact managers, messaging clients, games, and media clients/ players) (e.g., UE 110). The computing device 600 may be implemented as a special purpose computing device that is dedicated to the special purpose (e.g., UE 105). The computing device 600 may be implemented as a server capable of running home screen customization 120, artificial intelligence system 125, or any other feature described as implemented on a server.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The computing device 600 also includes a non-volatile storage area 668 within the memory 662. The non-volatile storage area 668 may be used to store persistent information that should not be lost if the computing device 600 is powered down. The application programs 666 may use and store information in the non-volatile storage area 668, such as e-mail or other messages used by an e-mail application, and the like. As should be appreciated, other applications may be loaded into the memory 662 and run on the computing device 600.

The computing device 600 has a power supply 670, which may be implemented as one or more batteries. The power supply 670 might further include an external power source, such as an AC adapter or a powered docking cradle that supplements or recharges the batteries.

The computing device 600 may also include a radio interface layer 672 that performs the function of transmitting and receiving radio frequency communications. The radio interface layer 672 facilitates wireless connectivity between the computing device 600 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa. The radio communications may include near field communications transports such as Bluetooth®, near-field communication (NFC), Ultra-Wide Band (UWB), Wi-Fi®, Wi-Fi® Direct, and the like.

The visual indicator 620 may be used to provide visual notifications, and/or an audio interface 674 may be used for producing audible notifications via the audio transducer 525. In the illustrated embodiment, the visual indicator 620 is a light emitting diode (LED) and the audio transducer 525 is a speaker. These devices may be directly coupled to the power supply 670 so that when activated, they remain on for a duration dictated by a notification mechanism even though the processor 660 and other components might shut down for conserving battery power. The LED 620 may be programmed to remain on indefinitely until the user takes action to indicate the powered-on status of the device. The audio interface 674 is used to provide audible signals to and receive audible signals from the user. For example, in addition to being coupled to the audio transducer 525, the audio interface 674 may also be coupled to a microphone to receive audible input, such as to facilitate a video conference or telephone conversation. The computing device 600 may further include a video interface 676 that enables an operation of an on-board camera 530 to record still images, video stream, and the like and which may facilitate video conferencing.

Computing device 600 may include further input and output components including a keypad 635, peripheral device port 630, and display 605. The display 605 may be an integrated display, such as on a mobile phone or laptop computer, or it may be a separate display connected via cable. In some embodiments, display 605 may function as both input and output by displaying information as well as receiving input via a touchscreen. Keypad 635 may be a built-in keyboard, such as on a mobile device or a laptop computer, or it may be a separate keyboard connected via cable. Peripheral device port 630 may provide ports for connecting other peripheral input and output devices such as scanners, printers, a mouse, and the like.

Computing device 600 includes a processor 660 for executing instructions stored in memory, thereby enabling functionality of the computing device 600. Computing device 600 may include a special-purpose processor 661 which may be a processor used for a special purpose. For example, a graphics processor dedicated to providing the processing power needed to generate graphics may be a special-purpose processor 661.

Computing device 600 may have additional features or functionality not depicted or described for simplicity of description. For example, the computing device 600 may also include additional data storage devices (removable and/or non-removable) such as, magnetic disks, optical disks, or tape. Such additional storage is illustrated by the non-volatile storage area 668.

Data/information generated or captured by the computing device 600 may be stored locally on the computing device 600, as described above, or the data may be stored on any number of storage media that may be accessed by the device via the radio interface layer 672 or via a wired connection between the computing device 600 and a separate computing device associated with the computing device 600, for example, a server computer in a distributed computing network, such as the Internet. As should be appreciated such data/information may be accessed via the computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
receiving, from a special purpose computing device, a request for a display layout and content for a home screen for the special purpose computing device, the request including a user account associated with the special purpose computing device, wherein the user account includes a first user profile for a user associated with the user account and a substrate profile for the user;

accessing data comprising:

display parameters of the special purpose computing device, wherein the display parameters comprise a physical screen size and a display resolution of the special purpose computing device, user information from the first user profile for the user, wherein the first user profile comprises user information specific to a software application or service accessed using the special purpose computing device, and user information from the substrate profile for the user, wherein the substrate profile comprises generic user information applicable to and used by multiple software applications or services accessed with the user account;

providing the data as input to an artificial intelligence system trained to generate a recommended display layout and recommended content based on the input, wherein the recommended display layout comprises a plurality of widgets for display, a type for each of the plurality of widgets, and a display location on the special purpose computing device home screen for each of the plurality of widgets, and wherein the recommended content comprises a content for each of the plurality of widgets;

receiving the recommended display layout and the recommended content from the artificial intelligence system; and transmitting the recommended display layout and the recommended content to the special purpose computing device to use for displaying the home screen.

2. The computer-implemented method of claim 1, wherein the input to the artificial intelligence system further comprises user information from a social media account associated with the user.

3. The computer-implemented method of claim 1, wherein:

the user account further includes a browser profile for the user; and the input to the artificial intelligence system further comprises user information from the browser profile.

4. The computer-implemented method of claim 3, wherein the browser profile comprises one or more of a search history, news channel preferences, tracked stock preferences, wallpaper, and voice assistant command history.

5. The computer-implemented method of claim 1, wherein the special purpose computing device is a dedicated video conferencing device.

6. The computer-implemented method of claim 1, further comprising:

storing the recommended display layout, the recommended content, and an identifier of the special purpose computing device in a data store.

7. The computer-implemented method of claim 1, further comprising:

receiving, from the special purpose computing device, a subsequent request for the display layout and the content for the home screen;

determining that the recommended display layout and the recommended content have been previously transmitted to the special purpose computing device;

accessing updated user information from the first user profile of the user and updated user information from the substrate profile of the user;

providing updated input comprising the updated user information and the recommended display layout to the artificial intelligence system, wherein the artificial intelligence system is further trained to generate an updated recommended content for the recommended display layout based on the updated input;

receiving the updated recommended content from the artificial intelligence system; and transmitting the updated recommended content to the special purpose computing device to use for displaying the home screen.

8. The computer-implemented method of claim 7, further comprising:

transmitting the recommended display layout with the updated recommended content to the special purpose computing device to use for displaying the home screen.

9. The computer-implemented method of claim 1, wherein the user information from the first user profile comprises one or more of calendar information associated with the first user profile, notifications associated with the first user profile, existing application integration associated with the first user profile, and user display preferences.

10. The computer-implemented method of claim 1, wherein the user information from the first user profile comprises one or more of a name of the user associated with the user account, a location of the user, a role of the user, and calendar events associated with the substrate profile.

11. The computer-implemented method of claim 1, wherein the display parameters further comprise one or more of display screen space, built-in applications, and application sizing information.

12. A system, comprising:

one or more processors; and a memory having stored thereon instructions that, upon execution by the one or more processors, cause the one or more processors to:

receive, from a special purpose computing device, a request for a display layout and content for a home screen for the special purpose computing device, the request including a user account associated with the special purpose computing device, wherein the user account includes a first user profile for a user associated with the user account and a substrate profile for the user;

access data comprising:

display parameters of the special purpose computing device, wherein the display parameters comprise a physical screen size and a display resolution of the special purpose computing device, user information from the first user profile for the user, wherein the first user profile comprises user information specific to a software application or service accessed using the special purpose computing device, and user information from the substrate profile for the user, wherein the substrate profile comprises generic user information applicable to and used by multiple software applications or services accessed with the user account;

provide the data as input to an artificial intelligence system trained to generate a recommended display layout and recommended content based on the input, wherein the recommended display layout comprises a plurality of widgets for display, a type for each of the plurality of widgets, and a display location on the home screen for each of the plurality of widgets, and wherein the recommended content comprises a content for each of the plurality of widgets;

receive the recommended display layout and the recommended content from the artificial intelligence system; and transmit the recommended display layout and the recommended content to the special purpose computing device to use for displaying the home screen.

13. The system of claim 12, wherein the input to the artificial intelligence system further comprises user information from a social media account associated with the user.

14. The system of claim 12, wherein:
the user account further includes a browser profile for the user; and
the input to the artificial intelligence system further comprises user information from the browser profile.

15. The system of claim 14, wherein the browser profile comprises one or more of a search history, news channel preferences, tracked stock preferences, wallpaper, and voice assistant command history.

16. The system of claim 12, wherein the special purpose computing device is an audio/visual virtual meeting device.

17. The system of claim 12, wherein the memory comprises further instructions that, upon execution by the one or more processors, cause the one or more processors to:
store the recommended display layout, the recommended content, and an identifier of the special purpose computing device in a data store.

18. The system of claim 12, wherein the memory comprises further instructions that, upon execution by the one or more processors, cause the one or more processors to:
receive, from the special purpose computing device, a subsequent request for the display layout and the content for the home screen;
determine that the recommended display layout and the recommended content have been previously transmitted to the special purpose computing device;
obtain updated user information from the first user profile of the user and updated user information from the substrate profile associated of the user;
provide updated input comprising the updated user information and the recommended display layout to the artificial intelligence system, wherein the artificial intelligence system is further trained to generate an updated recommended content for the recommended display layout based on the updated input;
receive the updated recommended content from the artificial intelligence system; and
transmit the updated recommended content to the special purpose computing device to use for displaying the home screen.

19. The system of claim 18, wherein the memory comprises further instructions that, upon execution by the one or more processors, cause the one or more processors to:
transmit the recommended display layout with the updated recommended content to the special purpose computing device to use for displaying the home screen.

20. The system of claim 12, wherein:
the user information from the first user profile comprises one or more of calendar information associated with the first user profile, notifications associated with the first user profile, existing application integration associated with the first user profile, and user display preferences;
the user information from the substrate profile comprises one or more of a name of the user associated with the user account, a location of the user, a role of the user, and calendar events associated with the substrate profile; and
the display parameters further comprise one or more of display screen space, built-in applications, and application sizing information.

* * * * *